US012784173B2

United States Patent
Lee et al.

(10) Patent No.: US 12,784,173 B2
(45) Date of Patent: Nov. 3, 2026

(54) TEST DEVICE AND OPERATING METHOD THEREOF

(71) Applicant: Samsung Electronics Co., Ltd., Suwon-si (KR)

(72) Inventors: Yubin Lee, Suwon-si (KR); Dayun Lee, Suwon-si (KR); Kundong Kim, Suwon-si (KR); Yongkoo Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 203 days.

(21) Appl. No.: 18/805,724

(22) Filed: Aug. 15, 2024

(65) Prior Publication Data

US 2025/0061558 A1 Feb. 20, 2025

(30) Foreign Application Priority Data

Aug. 18, 2023 (KR) ........................ 10-2023-0108266

(51) Int. Cl.

*G06T 7/00* (2017.01)
*G06V 10/764* (2022.01)
*G06V 10/82* (2022.01)

(52) U.S. Cl.

CPC .......... *G06T 7/0004* (2013.01); *G06V 10/764* (2022.01); *G06V 10/82* (2022.01)

(58) Field of Classification Search

CPC ......... G06T 7/0004; G06T 2207/20081; G06T 2207/20084; G06T 7/001;

(Continued)

(56) References Cited

U.S. PATENT DOCUMENTS 11,210,554 B2 12/2021 Dutta et al.
11,488,294 B2 11/2022 Wen et al.

(Continued)

FOREIGN PATENT DOCUMENTS

CN 113592859 B 1/2022
CN 115456145 A 12/2022

(Continued)

OTHER PUBLICATIONS

Meza, Pablo, et al. "A quantitative evaluation of fixed-pattern noise reduction methods in imaging systems." Iberoamerican Congress on Pattern Recognition. Berlin, Heidelberg: Springer Berlin Heidelberg, 2010.https://link.springer.com/chapter/10.1007/978-3-642-16687-7_40 (Year: 2010).*

*Primary Examiner* — Han Hoang
(74) *Attorney, Agent, or Firm* — Fish & Richardson P.C.

(57) ABSTRACT

A system for testing whether or not an image sensor included in an image frame is defective includes including a processor configured to execute machine-readable instructions that, when executed by the processor, cause the test device to generate a test image by performing one or more preprocessing operations on a raw image output from an image sensor, and to classify an image pattern of the test image as any one of patterns included in a first data set by using a first deep learning neural network trained based on the first data set and to determine, based on a classifying result, whether or not the image sensor is defective. The first data set comprises a data set for each pattern, classified to correspond to each of one or more defect patterns and to a normal pattern of an image.

17 Claims, 13 Drawing Sheets

(58) Field of Classification Search
CPC ........ G06T 2207/30148; G06V 10/764; G06V 10/82; G06V 10/443; G06N 3/08
See application file for complete search history.

(56) References Cited

U.S. PATENT DOCUMENTS

| | | | | |
|---|---|---|---|---|
| 2019/0025773 | A1* | 1/2019 | Yang | G06T 5/77 |
| 2020/0327377 | A1 | 10/2020 | Jaganathan et al. | |
| 2021/0374931 | A1* | 12/2021 | Kumar | G06T 7/0002 |
| 2025/0104830 | A1* | 3/2025 | Park | G01N 21/88 |

FOREIGN PATENT DOCUMENTS

| | | | | | |
|---|---|---|---|---|---|
| KR | 10-2297232 | B1 | | 9/2021 | |
| KR | 102342337 | B1 | * | 12/2021 | G01N 21/95 |

* cited by examiner (a) (b) (c)

FIG. 9

| Dataset | SUM | TP | FP | TN | FN | Acc | Precision | Recall | F1−score |
|---|---|---|---|---|---|---|---|---|---|
| FIRST TEST DB | 4,052 | 505 | 7 | 3,511 | 29 | 0.991 | 0.986 | 0.946 | 0.966 |
| SECOND TEST DB | 2,767 | 704 | 23 | 1,976 | 64 | 0.969 | 0.968 | 0.917 | 0.942 |
| TOTAL | 6,819 | 1,209 | 30 | 5,487 | 93 | 0.982 | 0.976 | 0.929 | 0.952 |

FIG. 10

| Sensor | #Image | A | | | B | |
|---|---|---|---|---|---|---|
| | | Spec | Acc. | F1-score | Acc. | F1-score |
| S1 | 174 | 160 | 1.0000 | 1.0000 | 1.0000 | 1.0000 |
| S2 | 222 | 68 | 0.9505 | 0.6209 | 0.9820 | 0.8182 |
| S3 | 253 | 120 | 1.0000 | 1.0000 | 1.0000 | 1.0000 |
| S4 | 48 | 51 | 0.8750 | 0.9286 | 0.9583 | 0.9737 |
| S5 | 247 | 150 | 0.6154 | 0.7059 | 0.9919 | 0.9952 |
| S6 | 704 | 150 | 0.7884 | 0.7950 | 0.9688 | 0.9753 |
| S7 | 122 | 100 | 0.8197 | 0.7963 | 1.0000 | 1.0000 |
| S8 | 1133 | 70 | 0.9382 | 0.7177 | 0.9824 | 0.9310 |
| S9 | 646 | 55 | 0.9536 | 0.9038 | 0.9923 | 0.9825 |
| Total | 3549 | - | 0.8867 | 0.7841 | 0.9845 | 0.9741 |

FIG. 13

| Set | 1 | 2 | 3 | 4 | 5 | 6 | 7 | 8 | 9 | 10 |
|---|---|---|---|---|---|---|---|---|---|---|
| Pearson | 0.981 | 0.990 | 0956 | 0.990 | 0.956 | 0.962 | 0.967 | 0.956 | 0.888 | 0.976 |

TEST DEVICE AND OPERATING METHOD THEREOF

CROSS-REFERENCE TO RELATED APPLICATION

This application is based on and claims priority under 35 U.S.C. § 119 to Korean Patent Application No. 10-2023-0108266, filed on Aug. 18, 2023, in the Korean Intellectual Property Office, the disclosure of which is incorporated by reference herein in its entirety.

BACKGROUND

Various example embodiments relate to a test device for testing whether or not an image sensor is defective, and/or an operating method of the test device.

A dark blemish denotes a stain pattern (e.g., a defect pattern) in an image output from an image sensor having a defect generated in a process of manufacturing the image sensor. In particular, when an image is captured in a low-illuminance environment by an image sensor having a defect, a dark portion of the image that is output may include one or more stain patterns (for example, one or more of a spot pattern, a diagonal pattern, etc.). The manufacturer may perform an electrical die sorting (EDS) process to pre-sort defective image sensors including such defects from among manufactured image sensors.

Recently, with the rapid developments in computing technologies, there has been an increased interest in techniques for sorting defective image sensors by applying machine learning and/or artificial neural networks (e.g., deep learning neural networks) to the EDS process. In the case of a previous EDS process based on an artificial neural network technique, high performance may be achieved in the case of an open data set for academic evaluation of the performance. However, in the case of an image data set for performance evaluation of an actual image sensor, a defective image sensor may not be accurately detected (or detected and classified) due to various factors (e.g., noise and/or shading, etc.). Also, in the case of the previous EDS process based on an artificial neural network, separate test algorithms or test models may have to be implemented according to types of image sensors to be tested.

SUMMARY

Various example embodiments provide a test device for an image sensor and/or an operating method of the test device. The test device is capable of improving the accuracy of defect determination with respect to the image sensor by using an artificial neural network, preventing or reducing the likelihood of and/or impact from an error caused by visual examination, and/or using the artificial neural network commonly applicable to defect determination of various types of image sensors.

Alternatively or additionally, various example embodiments provide a test device with respect to an image sensor and an operating method of the test device, the test device being capable of deriving, by using an artificial neural network, a defect level indicating a defective degree of the image sensor.

Technical objectives of inventive concepts are not limited to those mentioned above, and other unmentioned technical objectives will be clearly understood by one of ordinary skill in the art from the descriptions below.

According to various example embodiments, there is provided a test device including a processor configured to execute instructions that, when executed by the processor, cause the test device to generate a test image by performing one or more preprocessing operations on a raw image output from an image sensor, and to classify an image pattern of the test image as any one of patterns included in a first data set by using a first deep learning neural network trained based on the first data set and to determine, based on a classifying result, whether or not the image sensor is defective. The first data set comprises a data set for each pattern, classified to correspond to each of one or more defect patterns and to a normal pattern of an image.

Alternatively or additionally according to various example embodiments, there is provided an operating method of a test device, the operating method including generating a test image by performing one or more preprocessing operations on a raw image output from an image sensor, classifying an image pattern of the test image as any one of patterns included in a first data set by using a first deep learning neural network trained based on the first data set, and determining, based on a result of the classifying, whether or not the image sensor is defective. The first data set comprises a data set for each pattern, classified to correspond to each of one or more defect patterns and to a normal pattern of an image.

Alternatively or additionally according to various example embodiments, there is provided a system for testing whether or not an image sensor is defective, the system including a memory configured to store one or more instructions; and a processor configured to execute the one or more instructions stored in the memory to, generate a test image by performing one or more preprocessing operations on a raw image received from an image sensor, detect an image pattern of the test image by using a first deep learning neural network trained based on a first data set, determine, based on a detecting result regarding the image pattern, whether or not the image sensor is defective, and determine a defect level of the test image by using a second deep learning neural network trained based on a second data set.

BRIEF DESCRIPTION OF THE DRAWINGS

Some example embodiments will be more clearly understood from the following detailed description taken in conjunction with the accompanying drawings in which:

FIG. 9 is a diagram for describing the degree of accuracy of an operation, performed by a test device, of determining whether or not an image sensor is defective, according to some example embodiments;

FIG. 10 is a diagram for describing the degree of accuracy of an operation, performed by a test device, of determining whether or not an image sensor is defective, according to some example embodiments;

FIG. 13 is a diagram for describing a degree of accuracy of an operation, performed by a test device, of determining a defect level, according to some example embodiments.

DETAILED DESCRIPTION OF VARIOUS EXAMPLE EMBODIMENTS

Figure 1:
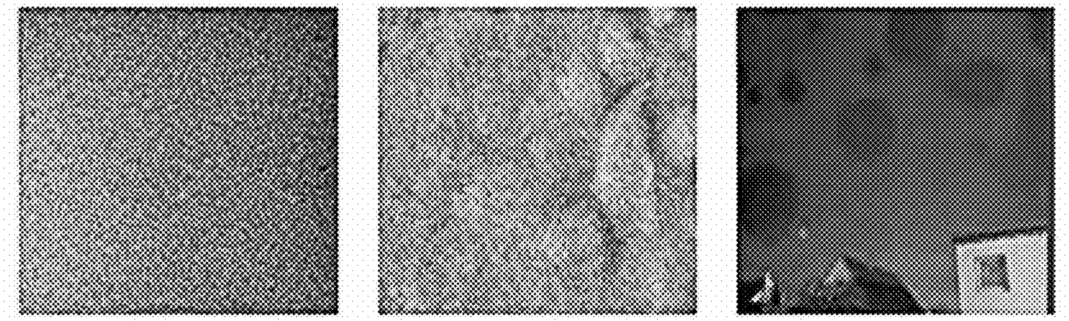
FIG. 1 illustrates an example of an image including a defect pattern, according to some example embodiments.

Hereinafter, some example embodiments will be described by referring to the accompanying drawings to describe the inventive concept in detail so that one of ordinary skill in the art may easily implement the inventive concept. When describing the inventive concept, well-known aspects not relevant to the gist of the inventive concept may be omitted.

With respect to some example embodiments disclosed herein, specific structural and/or functional descriptions are given just for the purpose of describing embodiments. Example embodiments can be implemented in various forms, and inventive concepts shall not be interpreted to be limited to the embodiments described herein.

Inventive concepts may be diversely modified and may have various forms. Thus, some example embodiments may be illustrated in the drawings and described in detail in the specification. However, this is not intended to limit inventive concepts to predetermined or particular forms disclosed herein. Inventive concepts shall be understood to include all modifications, equivalents, or substitutes within the idea and the technical scope of the inventive concept.

As described herein, while terms such as first, second, etc. may be used to describe various elements, the elements shall not be limited by those terms. The terms are used only for the purpose of distinguishing one element from another element. For example, without deviating from the scope of the claims of inventive concepts, a first element may also be referred to as a second element, and similarly, the second element may also be referred to as the first element.

Terms as used herein are simply used for describing a predetermined embodiment, and they are not intended to limit the inventive concept. The singular expressions "a" and "an" are intended to include the plural forms as well, unless the context clearly indicates otherwise. As described, the term "including," "having," or the like is used to indicate a presence of a feature, a number, a step, an operation, an element, a component, or a combination thereof described herein, and the term does not exclude a presence of one or more other features, numbers, steps, operations, elements, components, or a combination thereof or the possibility of an addition of the same.

Also, when some example embodiments described herein can be differently implemented, a function or an operation in a predetermined block may be implemented in a different order from a flowchart. For example, consecutive two blocks may be simultaneously performed in reality, and according to relevant functions or operations, the blocks may be reversely performed.

As described herein, a defect level of a test image may be estimated as a defect level of an image sensor corresponding to the test image.

Hereinafter, embodiments are described in detail with reference to the accompanying drawings.

FIG. 1 illustrates an example of an image including a defect pattern, according to some example embodiments.

Referring to FIG. 1, (a) indicates a normal image, (b) indicates an image including a defect pattern (e.g., a dark blemish), and (c) indicates an image taken in a low-illuminance environment and including a highly visible defect pattern (e.g., a dark blemish).

A test and/or an analysis may identify (a) as image data sensed by an image sensor (a good product) in which no defect is generated in a manufacturing process and is a clean image from the entirety of which no defect pattern is detected.

However, (b) may be identified as image data sensed by an image sensor (defective) in which a defect is generated in a manufacturing process, and the entire image includes a defect pattern of a stain shape having irregularly and radically changing brightness. This stain-shaped defect pattern may be referred to as "a dark blemish pattern," and the defect pattern may have various types, such as a spot pattern, a diagonal pattern, an error pattern, etc.

Additionally or alternatively, (c) may be identified as image data sensed in a low-illuminance environment by an image sensor (defective) in which a defect is generated in a manufacturing process like the case of (b). When image data is sensed in a low-illuminance environment, the conspicuousness of a stain shape of a dark blemish pattern is increased in a dark region of the image data. For example, the stain shape of the dark blemish pattern has increased visibility in the dark region of the image data. For example, a test and/or an analysis may identify in (c) sensed in the low-illuminance environment that a stain shape of a spot pattern has increased visibility in a dark sky portion.

According to some example embodiments, provided are a test device and/or an operating method of the test device, the test device including a defect detection module configured to determine whether or not an image sensor is defective by using a deep learning neural network trained based on a data set with respect to one or more defect patterns.

Alternatively or additionally, according to some example embodiments, provided are a test device and/or an operating method of the test device, the test device including a defect-level calculation module configured to derive a defect level of an image sensor by using a deep learning neural network trained based on a data set with respect to the visibility of a defect pattern in an image. Detailed example embodiments with respect to these aspects are described with reference to the drawings below.

Figure 2:
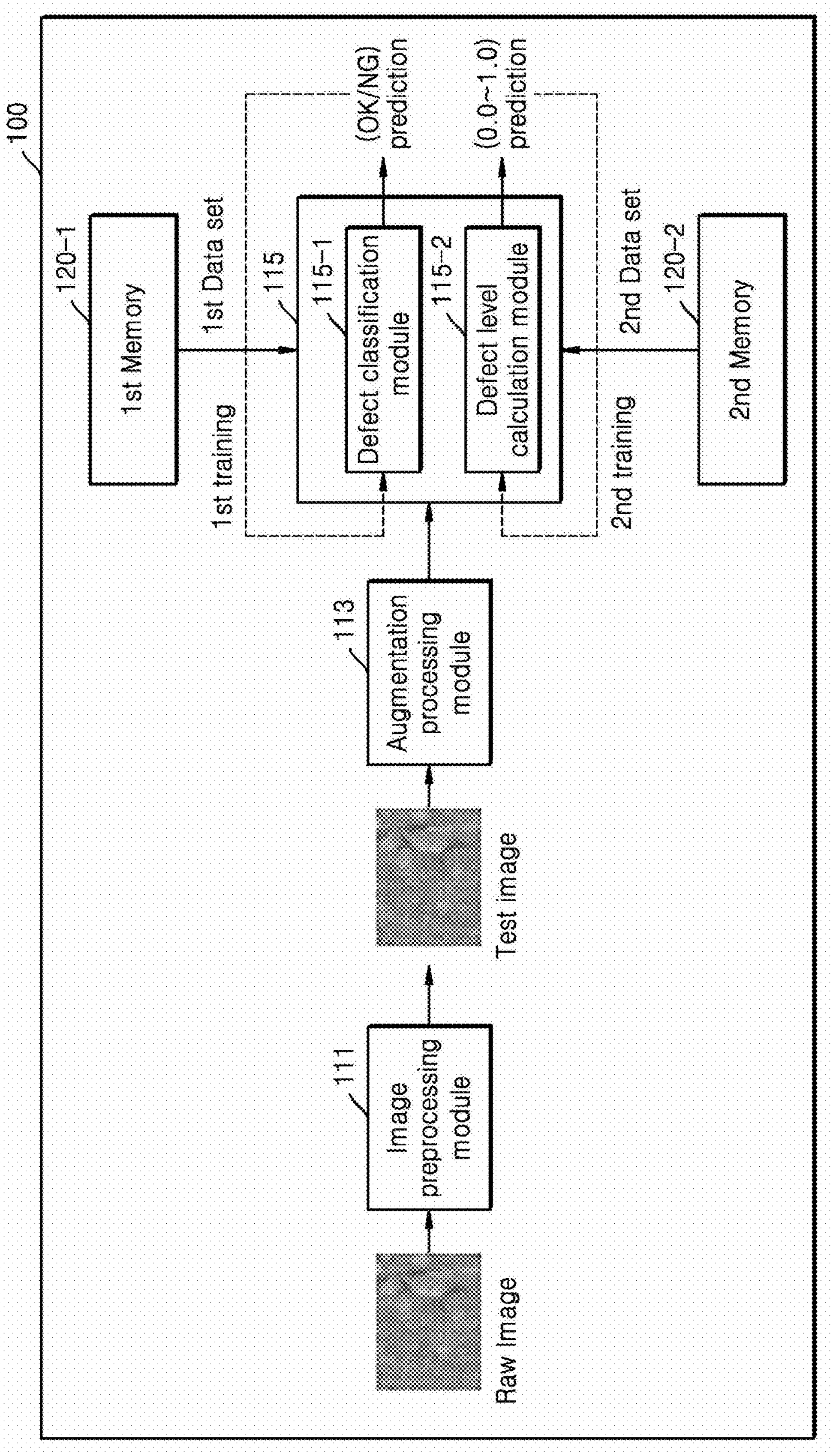
FIG. 2 is a block diagram of a processor of a test device according to some example embodiments.

FIG. 2 is a block diagram of a processor of a test device 100 according to some example embodiments.

Referring to FIG. 2, the test device 100 according to various example embodiments may include an image preprocessing module 111, an augmentation processing module 113, a defect detection module 115, a first memory 120-1, and a second memory 120-2. According to some example embodiments, each of the image preprocessing module 111, the augmentation processing module 113, and the defect detection module 115 may be realized as a logic block realized by logic synthesis, a software block executed by a processor, or a combination of the logic block and the software block. According to some example embodiments, each of the image preprocessing module 111, the augmentation processing module 113, and the defect detection module 115 may correspond to a procedure including a set of a plurality of instructions executed by a processor and may be stored in a memory accessible by the processor. In FIG. 2, the test device 100 is illustrated to include the first memory 120-1 and the second memory 120-2, for convenience of explanation. However, the test device 100 is not limited thereto. The test device 100 according to inventive concepts may be realized to include one or more memories in which the first memory 120-1 and the second memory 120-2 are combined, according to functions of the test device 100.

In FIG. 2, it is assumed that a first deep learning neural network and a second deep learning neural network are trained based on a Huber-loss function ($L_\delta(y, f(x))$) in which merits of L1 (MAE) loss and L2 (MSE) loss are combined in order to minimize effects of an outlier and perform stable training. The Huber-loss function ($L_\delta(y, f(x))$ may be calculated based on Equation 1.

[Equation 1]

$$L_\delta(y, f(x)) = \begin{cases} \frac{1}{2}(y - f(x)^2 & \text{for } |(y - f(x)| \le \delta, \\ \delta \cdot \left(|y - f(x)| - \frac{1}{2}\delta\right), & \text{otherwise} \end{cases}$$

Here, "y" may denote a reference value, "f(x)" may denote a prediction value output from a deep learning neural network, and "δ" may denote a derivation value (such as a dynamically determined, or, alternatively, a predetermined deviation value).

The image preprocessing module 111 may perform one or more preprocessing operations on a raw image received from a target image sensor to be tested. Here, the one or more preprocessing operations may correspond to processing operations for making a defect pattern in an image conspicuous so as to be easily detected and may include one or more of a calibration operation, a fixed-point noise reduction (FPNR) operation, a filtering operation, and a combination thereof, performed on the raw image. The image preprocessing module 111 may generate a test image by performing the one or more preprocessing operations on the raw image. The image preprocessing module 111 may transmit the test image to the augmentation processing module 113.

The augmentation processing module 113 may perform an augmentation processing operation on the test image received from the image preprocessing module 111. Here, the augmentation processing operation may correspond to a processing operation performed by the test device so as to increase the degree of accuracy for determining whether or not a target image sensor is defective or for determining a defect level of the target image sensor and may include at least one of flipping processing, rotation processing, contrast processing, or a combination thereof. For example, the augmentation processing module 113 may transmit, to the defect detection module 115, a final test image generated by performing an augmentation processing operation (for example, a flipping processing) to reverse a right portion and a left portion of the test image.

The defect detection module 115 may include a defect classification module 115-1 and a defect level calculation module 115-2, wherein the defect classification module 115-1 may be configured to determine (or predict or assess), based on an image pattern detected from the test image, whether or not a target image sensor is defective, and the defect level calculation module 115-2 may be configured to determine (or predict or assess) a defect level indicating a defective degree of the target image sensor.

The defect classification module 115-1 of the defect detection module 115 may compare an image pattern of the test image with each of patterns included in a first data set by using a first deep learning neural network trained (hereinafter, referred to as first training) based on the first data set and may classify the image pattern as any one of the patterns included in the first data set. The first data set may include a data set for each pattern, which is classified or pre-classified to correspond to a normal pattern of an image and each of one or more defect patterns (e.g., one or more of a spot pattern, a diagonal pattern, and an error pattern), and the first data set may be transmitted from the first memory 120-1 in which the first data set is stored to the defect classification module 115-1 of the defect detection module 115. For example, the defect classification module 115-1 may calculate, based on a result of the first training of the first deep learning neural network, a matching score between the image pattern and the normal pattern and a matching score between the image pattern and each of the one or more defect patterns, and may classify the image pattern as a pattern having the highest matching score from among the scores calculated with respect to the image pattern of the test image. According to some example embodiments, the test device 100 may apply weights, such those determined through empirical study (e.g., weights of 1:1:7:1 or, alternatively, predetermined, dynamically determined, etc.) to the matching score of the normal pattern, the matching score of a spot pattern, the matching score of a diagonal pattern, and the matching score of an error pattern with respect to the image pattern. It is described with reference to FIG. 2 that the predetermined weights (e.g., the weights of 1:1:7:1) are applied. However, the test device 10 according to some example embodiments is not limited thereto and may apply various weights according to an attribute of an image sensor or a feature of an image. The test device 100 may classify the image pattern as the pattern having the highest matching score based on a result of the calculating of the matching score reflecting the weights.

The defect classification module 115-1 may determine (or predict or assess), based on a classifying result, whether or not the target image sensor is defective. For example, when the defect classification module 115-1 classifies the image pattern as the normal pattern, the defect classification module 115-1 may determine (or predict or assess) that the image sensor is a good product OK or passing/acceptable, and when the defect classification module 115-1 classifies the image pattern as any one of the one or more defect patterns, the defect classification module 115-1 may determine (or predict or assess) that the target image sensor is a defective product NG or no good/not acceptable of a type corresponding to the image pattern. For example, when the image pattern is classified as the spot pattern from among the one or more defect patterns, the defect classification module 115-1 may determine that the target image sensor is a defective product having a dark blemish of the spot pattern.

The defect level calculation module 115-2 of the defect detection module 115 may determine a defect level of the test image (or the target image sensor) by using a second deep learning neural network (e.g., a regression model) trained (hereinafter, referred to as second training) based on a second data set. Here, the defect level of the test image (or the target image sensor) may be determined based on the visibility of the entire defect patterns in the test image, the entire defect patterns including the one or more defect patterns. As described herein, the defect level of the test image may be estimated as a defect level of an image sensor corresponding to the test image.

The defect level calculation module 115-2 may compare an image pattern of the test image with a data set for each defect level included in the second data set, by using the second deep learning neural network trained (hereinafter, referred to as the second training) based on the second data set and may determine (or predict) the image pattern as any one of the defect levels included in the second data set. Here, the defect level of the test image (or the target image sensor) may be determined based on the visibility of the entire defect patterns included in the test image. The second data set may include the data set for each defect level, which is classified or pre-classified according to an intensity of the visibility of the entire defect patterns, for the second training of the second deep learning neural network, and the second data set may be transmitted from the second memory 120-2 in which the second data set is stored to the defect level classification module 115-2 of the defect detection module 115. For example, the defect level calculation module 115-2 may calculate, based on a result of the second training of the second deep learning neural network, a matching score between the entire defect patterns included in the test image and the data set for each defect level and may determine (or predict or assess) the defect level of the test image as a level having the highest matching score from among the calculated scores. For example, the defect level calculation module 115-2 may determine (or predict or assess) the defect level of the test image as any one of the total of 11 levels from a level "0.0" to a level "1.0." In FIG. 2, it is described that the defect level of the test image is determined as any one of the total of 11 levels from the level "0.0" to the level "1.0." However, the test device 100 according to some example embodiments is not limited thereto and may determine the defect level based on various ranges and/or numbers of levels according to the intensity of the visibility.

The image preprocessing module 111 and the augmentation processing module 113 of FIG. 2 may be used also in a data training process of the test device 100 in order to improve the accuracy of the training.

In FIG. 2, it is assumed that the first deep learning neural network and the second deep learning neural network are trained based on a Huber-loss function for the stable training with minimized effects of an outliner. However, the test device 100 according to some example embodiments is not limited thereto and may test whether or not an image sensor is defective, based on various functions or algorithms.

The test device 100 according to some example embodiments may maintain and/or amend the defect classification module (the first deep learning neural network) trained based on the first data set and the defect level calculation module (the second deep learning neural network) trained based on the second data set, according to the characteristics of the image sensor. Therefore, it may be possible to provide a test device commonly applicable for determining whether or not various types of image sensors are defective and an operating method of the test device.

Figure 3:
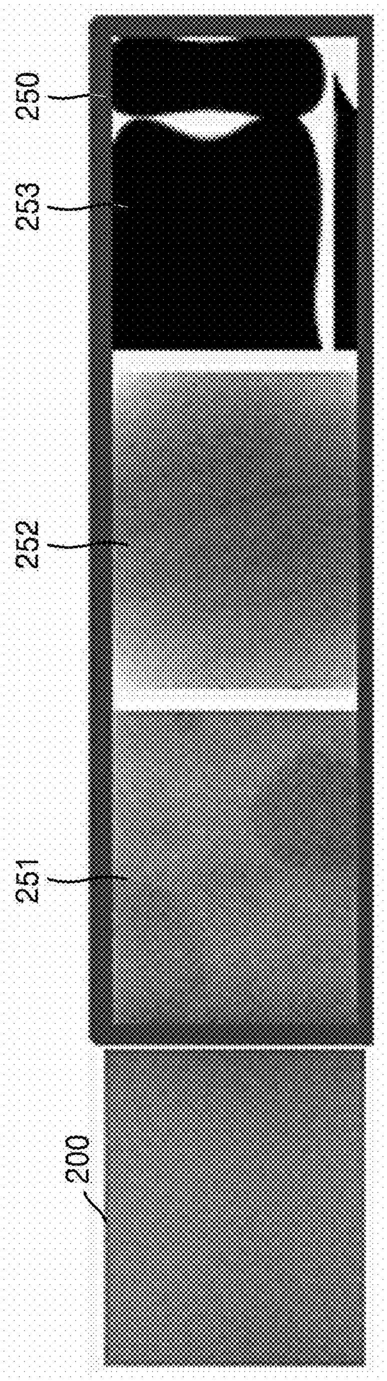
FIG. 3 illustrates an example of a data set according to some example embodiments.

FIG. 3 illustrates an example of a data set according to some example embodiments.

In detail, FIG. 3 is a diagram for describing the first data set of FIG. 2. In FIG. 3, the same descriptions as FIG. 2 may not be repeated.

Referring to FIG. 3, the first data set may include a data set for each pattern, which is classified or pre-classified to correspond to a normal pattern 200 of an image, and to correspond to each of one or more defect patterns 250, and the first data set may be a data set for training the first deep learning neural network in the defect classification module (115-1 of FIG. 2) described above. Here, the data set with respect to each of the one or more defect patterns 250 may denote a data set pre-classified for each defect pattern and may include a data set with respect to a spot pattern 251, a data set with respect to a diagonal pattern 252, or a data set with respect to an error pattern 253.

According to various example embodiments, the defect classification module 115-1 (see FIG. 2) of the defect detection module 115 (see FIG. 2) may learn a reference for determining which image data corresponds to the normal pattern 200 of the image, through the first deep learning neural network and based on the pre-classified first data set. Also, the defect classification module 115-1 (see FIG. 2) may learn a reference for determining which image data corresponds to the spot pattern 251, the diagonal pattern 252, or the error pattern 253, through the first deep learning neural network and based on the pre-classified first data set. For example, based on the pre-classified first data set, the defect classification module 115-1 (see FIG. 2) may learn an irregular circular-shaped stain pattern in an image as the spot pattern 251, an irregular diagonal stain pattern as the diagonal pattern 252, and a stain pattern having both an irregular shape and an irregular size as the error pattern 253.

According to some example embodiments, the defect classification module 115-1 (see FIG. 2) may determine (or predict and/or assess) whether or not a target image sensor is defective, by using the first deep learning neural network trained as described above. For example, based on the learned references, the defect classification module 115-1 (see FIG. 2) may classify an image pattern of a test image as any one of the normal pattern 200, the spot pattern 251, the diagonal pattern 252, and the error pattern 253. According to a classifying result, the defect classification module 115-1 (see FIG. 1) may determine (or predict) whether or not the target image sensor is defective.

It is described with reference to FIG. 3 that the one or more defect patterns 250 may include the spot pattern 251, the diagonal pattern 252, and the error pattern 253. However, this is only for convenience of explanation, and inventive concepts is not limited thereto. Defect patterns according to some example embodiments may include various patterns in addition to the three patterns described above.

Figure 4:
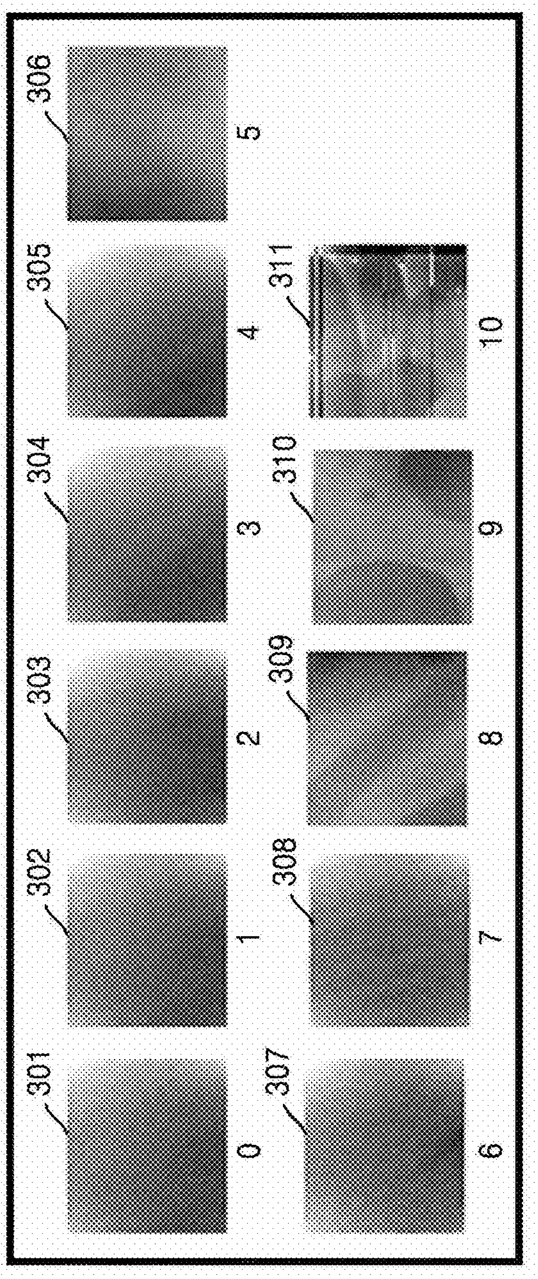
FIG. 4 illustrates an example of a data set according to some example embodiments.

FIG. 4 illustrates an example of a data set according to some example embodiments.

In detail, FIG. 4 is a diagram for describing the second data set of FIG. 2. Descriptions of FIG. 4 that are the same as the descriptions of FIG. 2 may be substituted by the descriptions of FIG. 2.

Referring to FIG. 4, the second data set may include a data set for each defect level, which is classified or pre-classified according to an intensity of the visibility of the entire defect patterns included in an image, and the second data set may be configured to train the second deep learning neural network of the defect level calculation module 115-2 (see FIG. 2). For example, the second data set may include the data set for each of the total of 11 defect levels from a level 0.0 to a level 1.0, that is, a zeroth level (e.g., 0.0) 301, a first level (e.g., 0.1) 302, a second level (e.g., 0.2) 303, a third level (e.g., 0.3) 304, a fourth level (e.g., 0.4) 305, a fifth level (e.g., 0.5) 306, a sixth level (e.g., 0.6) 307, a seventh level (e.g., 0.7) 308, an eighth level (e.g., 0.8) 309, a ninth level (e.g., 0.9) 310, and a tenth level (e.g., 1.0) 311.

According to some example embodiments, the defect level calculation module 115-2 (see FIG. 2) of the defect detection module 115 (see FIG. 2) may learn a reference with respect to each defect level corresponding to an intensity of the visibility of the entire detect patterns included in a test image, through the second deep learning neural network, based on the pre-classified second data set. For example, the defect level calculation module 115-2 (see FIG. 2) may learn a defect level in the case where a circular-shaped stain pattern is vivid in a right and a left portion of an image as the ninth level (e.g., 0.9) 310.

According to some example embodiments, the defect level calculation module 115-2 (see FIG. 2) may determine (or predict and/or assess) a defect level of the test image by using the second deep learning neural network trained as described above. (Here, the defect level of the test image may be estimated as a defect level of a target image sensor sensing the test image). For example, based on the learned reference, the defect level calculation module 115-2 (see FIG. 2) may determine (or predict and/or assess) the defect level of the test image as any one level of from the zeroth level 301 to the tenth level 311, according to the intensity of the visibility of the entire defect patterns included in the test image. For example, the defect level calculation module 115-2 (see FIG. 2) may determine (or predict and/or assess) an increased defect level of the test image, as the intensity of the visibility of the entire defect patterns included in the image is increased.

FIG. 4 illustrates that the defect levels correspond to the zeroth level 301 to the tenth level 311. However, this is only for convenience of explanation, and inventive concepts is not limited thereto. Defect levels according to some example embodiments may include various numbers of defect levels in addition to the total of eleven defect levels described above.

Figure 5:
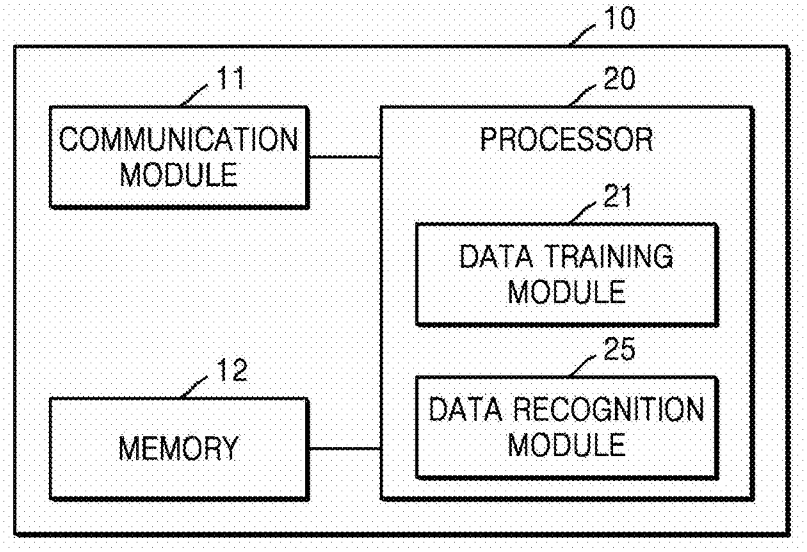
FIG. 5 is a block diagram of a test system according to some example embodiments.

FIG. 5 is a block diagram of a test system 10 according to some example embodiments.

Referring to FIG. 5, the test system 10 may include a display module (not shown), a communication module 11, a memory 12, and a processor 20.

The display module (not shown) may display, according to control by the processor 20, information processed by the processor 20. The display module (not shown) may output image data image-processed by the processor 20, on a display (not shown) of the test system 10. In some example embodiments, the display module (not shown) may output the image data on the display (not shown) through various graphics user interfaces (GUIs), according to control by the processor 20.

The memory 12 may store various types of data, programs, and/or applications for driving and controlling the test system 10. The programs stored in the memory 12 may include one or more instructions. The programs (the one or more instructions) or the applications stored in the memory 12 may be executed by the processor 20.

The memory 12 according to some example embodiments may include one or more instructions forming a deep learning neural network. Also, the memory 12 may include one or more instructions for controlling the deep learning neural network. The deep learning neural network may include a plurality of layers including one or more instructions to classify an image pattern of an input test image as any one of patterns included in the first data set of FIG. 3 and determine (or predict and/or assess) whether or not a target image sensor is defective, and/or to determine a defect level of the target image sensor by classifying the defect level of the test image (or the target image sensor) as any one of levels included in the second data set of FIG. 4 based on the intensity of the visibility of the entire defect patterns included in the input test image.

The processor 20 may execute an operation system (OS) and various applications stored in the memory 12. The processor 20 may include one or more processors including a single core, a dual core, a triple core, a quad core, or higher multiple core. Also, for example, the processor 20 may be realized as a main processor (not shown) and a sub-processor (not shown) operating in a sleep mode.

The processor 20 according to some example embodiments may obtain an image. For example, the processor 20 may receive sensed raw image data from a target image sensor, the performance of which is to be tested, may store the raw image data in the memory 12, and then, may read the raw image data. Alternatively or additionally, the processor 20 may receive, from an external server (e.g., one or more of a social networking service (SNS) server, a cloud server, a content-providing server, etc.), the raw image data sensed by the target image sensor, through the communication module 11.

The processor 20 according to some example embodiments may use the instructions stored in the memory 12 and forming the deep learning neural network to detect an image pattern of the test image and determine (or predict and/or assess) whether or not the target image sensor is defective based on a result of classifying the image pattern by using the deep learning neural network trained based on the first data set.

The processor 20 according to some example embodiments may use the instructions stored in the memory 12 and forming the deep learning neural network to calculate the intensity of the visibility of the entire defect patterns included in the test image and determine (or predict) a defect level of the test image (or the target image sensor) corresponding to the intensity of the visibility of the entire defect patterns by using the deep learning neural network trained based on the second data set.

The processor 20 according to some example embodiments may include a data training module 21 and a data recognition module 25. The data training module 21 may obtain data to be used for training and apply the obtained data to a data recognition model to be described below so as to train the data recognition model with respect to a determination reference for determining whether or not the target image sensor is defective or the defect level of the target image sensor. For example, the data training module 21 may train the data recognition model (e.g., the first deep learning neural network of FIG. 2) to have a reference with respect to the normal pattern 200 (see FIG. 3) of the image, the spot pattern 251 (see FIG. 3), the diagonal pattern 252 (see FIG. 3), or the error pattern 253 (see FIG. 3). For example, the data training module 21 may train the data recognition model (e.g., the second deep learning neural network of FIG. 2) to have a determination reference for determining (or predicting) the corresponding defect level according to the intensity of the visibility of the entire defect patterns.

Based on the data trained by using the data training module 21, the data recognition module 25 may determine (or predict) whether or not the target image sensor is defective by classifying the image pattern of the test image or may determine (or predict) the defect level of the target image sensor.

At least one of the data training module 21 and the data recognition module 25 may be manufactured as at least one hardware chip and mounted on the test system 10; however, example embodiments are not limited thereto. For example, at least one of the data training module 21 and the data recognition module 25 may be manufactured as an artificial intelligence (AI)-dedicated hardware chip or as part of a previous general-purpose processor (for example, a central processing unit (CPU) or an application processor) and/or a graphics-dedicated processor (for example, a graphics processing unit (GPU)) and mounted on various test systems 10 described above.

In this case, the data training module 21 and the data recognition module 25 may be mounted on one test system (or device) 10 or may be mounted on different systems (or devices), respectively. Also, the data training module 21 and the data recognition module 25 may connect to each other by wire or wirelessly. Thus, information about a model (e.g., a deep learning neural network) formed by the data training module 21 may be provided to the data recognition module 25, or data that is input into the data recognition module 25 may be provided to the data training module 21 as additional training data.

At least one of the data training module 21 and the data recognition module 25 may be realized as a software module. When at least one of the data training module 21 and the data recognition module 25 is realized as a software module (or a program module including an instruction), the software module may be stored in non-transitory computer-readable recording media. Also, in this case, the one or more software modules may be provided by an OS or a predetermined application. Alternatively, some of the one or more software modules may be provided by an OS, and the others may be provided by an application such as a desired application (or, alternatively, a predetermined application).

Figure 6:
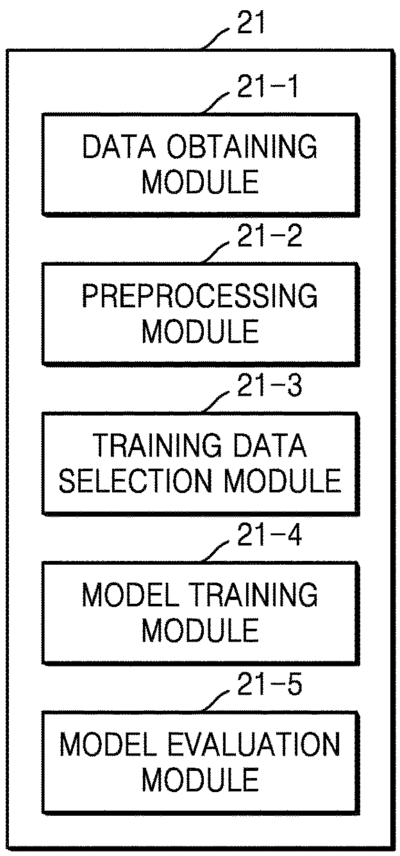
FIG. 6 is a block diagram of a data training module according to some example embodiments.

FIG. 6 is a block diagram of the data training module 21 according to some example embodiments.

Referring to FIG. 6, the data training module 21 according to some example embodiments may include a data obtaining module 21-1, a preprocessing module 21-2, a training data selection module 21-3, a model training module 21-4, and a model evaluation module 21-5. However, it is only some example embodiments, and the data training module 21 may include some of the elements described above or may further include other elements in addition to the elements described above.

The data obtaining module 21-1 may obtain data needed to or used to determine whether or not a target image sensor is defective or a defect level of a test image (or the target image sensor). For example, the data obtaining module 21-1 may obtain raw image data sensed by the target image sensor, on which performance evaluation is to be performed. Alternatively or additionally, the data obtaining module 21-1 may obtain raw image data from one or more of an external server, such as an SNS server, a cloud server, or a content-providing server.

The preprocessing module 21-2 may preprocess the obtained raw image data so that the obtained raw data may be used for a training operation with respect to determining whether or not a target image sensor is defective or a defect level of a test image (or the target image sensor). The preprocessing module 21-2 may process the obtained raw image data into a predetermined format, so that the model training module 21-4 to be described below may use the obtained raw image data for the training operation with respect to determining whether or not the target image sensor is defective or the defect level of the test image (or the target image sensor). For example, the preprocessing module 21-2 may perform at least one of a calibration operation, an FPNR operation, or a filtering operation on the obtained raw image data.

The training data selection module 21-3 may select, from the preprocessed data, data needed for or used for the training operation. The selected data may be provided to the model training module 21-4. The training data selection module 21-3 may select, from the preprocessed data, the data needed for or used for the training operation, according to a predetermined selection criterion for determining whether or not the target image sensor is defective or the defect level of the test image (or the target image sensor). Also, the training data selection module 21-3 may select the data according to a selection criterion predetermined based on a training operation by the model training module 21-4 to be described below. For example, based on the preprocessed data, the training data selection module 21-3 may determine types, the numbers, or levels of patterns having relatively increased relevance (for example, increased density with respect to a probability distribution) with respect to a category corresponding to an image pattern (e.g., a normal pattern, a spot pattern, a diagonal pattern, an error pattern, or the like), as data included in a reference for classifying the image pattern of a test image. For example, based on the preprocessed data, the training data selection module 21-3 may determine types, the numbers, or levels of defect patterns having relatively increased relevance (for example, increased density of a probability distribution) with respect to a category corresponding to the intensity of the visibility of the entire defect patterns, as data included in a reference for determining a defect level of the test image.

The model training module 21-4 may train, based on training data, the data recognition model to have a determination reference with respect to determining whether or not a target image sensor is defective or a defect level of a test image (or the target image sensor). Also, the model training module 21-4 may also train the data recognition model with respect to a criterion for selecting which training data is to be used in order to determine whether or not the target image sensor is defective or the defect level of the test image (or the target image sensor). For example, the model training module 21-4 may train the data recognition model to have a first reference, as the determination reference for determining whether or not the target image sensor is defective. Here, the first reference may include types, the numbers, or levels of pattern attributes used for the test system 10 to classify an image pattern in the test image from a training image by using a neural network. For example, the model training module 21-4 may train the data recognition model to have a second reference, as the determination reference for determining, by using the neural network, the defect level of the test image (or the target image sensor) in the training image. Here, the second reference may include types, the numbers, or levels of defect patterns used by the test system 10 to determine, by using the neural network, the defect level corresponding to the intensity of the visibility of the entire defect patterns included in the test image in the training image.

Also, the model training module 21-4 may train, based on the training data, the data recognition model used to determine whether or not the target image sensor is defective or the defect level of the test image (or the target image sensor). In this case, the data recognition model may be a pre-established model (e.g., an RESNET 101 model or an RESNET 108 model). For example, the data recognition model may be pre-established by receiving default training data (for example, a sample image, etc.) as an input. The data recognition model may be established by taking into account an application field of the recognition model, a purpose of training, the computer performance of a device, or the like. The data recognition model may be, for example, based on a neural network. For example, models such as a deep neural network (DNN), a recurrent neural network (RNN), and a bidirectional recurrent deep neural network (BRDNN) may be used as data recognition models, but inventive concepts is not limited thereto. For example, the defect classification module 115-1 of FIG. 2 may use a model (e.g., ResNet 101-D) that uses the whole feature map by adding average pooling to a previous structure (e.g., ResNet 101). For example, the defect level calculation module 115-2 of FIG. 2 may use a model (e.g., ResNet 18-D) that uses the whole feature map by adding average pooling to a previous structure (e.g., ResNet 18). Also, the defect classification module 115-1 and the defect level calculation module 115-2 of FIG. 2 may add a fully connected layer to improve the accuracy of classification.

According to various embodiments, when there are a plurality of pre-established data recognition models, the model training module 21-4 may determine a data recognition model having relatively increased relevance between input training data and default training data, as the data recognition model on which a training operation is to be performed.

Also, the model training module 21-4 may train the data recognition model through, for example, supervised learning having training data for a training operation with respect to a determination reference as an input value. Also, the model training module 21-4 may train the data recognition model through unsupervised learning in which a determination reference for determining whether or not a target image sensor is defective or a defect level of a test image (or the target image sensor) is discovered by the data recognition model by learning by itself the determination reference by using data needed to or used to determine whether or not the target image sensor is defective or the defect level of the test image (or the target image sensor) without additional supervision.

Also, the model training module 21-4 may train the data recognition model through, for example, reinforcement learning in which feedback with respect to whether or not a result of determining whether or not the target image sensor is defective or the defect level is appropriate is used.

Also, when the data recognition model is trained, the model training module 21-4 may store the trained data recognition model. In this case, the model training module 21-4 may store the trained data recognition model in the memory 12 (see FIG. 5) of the test system 10 including the data training module 21. Alternatively, the model training module 21-4 may store the trained data recognition model in the memory 12 (see FIG. 5) of the test system 10 including the data recognition module 25 to be described below. Alternatively, the model training module 21-4 may store the trained data recognition model in a memory of a server connected to the test system 10 by a wired or a wireless network.

In this case, the memory storing the trained data recognition model may also store, for example, a command or data related to at least another element of the test system 10. Also, the memory may store software and/or a program. The program may include, for example, a kernel, middleware, an application programming interface (API), and/or an application program (or an "application").

The model evaluation module 21-5 may input evaluation data into the data recognition model, and when a recognition result output from the evaluation data does not satisfy a predetermined criterion, may make the model training module 21-4 perform the training operation again. In this case, the evaluation data may be data predetermined for evaluating the data recognition model. Here, the evaluation data may include a match rate between the determination of a good product/defective product with respect to the target image sensor based on the data recognition model and a result in reality, a match rate between the determination of the defect level of the target image sensor and the defect level in reality according to the intensity of the visibility of defect patterns.

For example, the model evaluation module 21-5 may evaluate that a predetermined criterion is not satisfied, when the number or a rate of pieces of evaluation data with respect to which recognition results are incorrect, exceeds a predetermined threshold value, from among recognition results of the trained data recognition model, with respect to the evaluation data. For example, when the predetermined criterion is defined as a rate of 2%, the model evaluation module 21-5 may evaluate that the trained data recognition model is not appropriate, when the trained data recognition model outputs wrong recognition results with respect to more than 20 pieces of evaluation data from among the total of 1,000 pieces of evaluation data.

When there are a plurality of trained data recognition models, the model evaluation module 21-5 may evaluate whether a predetermined criterion is satisfied with respect to each trained video recognition model and may determine a model satisfying the predetermined criterion as a final data recognition model. In this case, when there are a plurality of models satisfying the predetermined criterion, the model evaluation module 21-5 may determine a predetermined number of models, i.e., one or more models, as the final data recognition model, according to an order of a high evaluation score.

At least one of the data obtaining module 21-1, the preprocessing module 21-2, the training data selection module 21-3, the model training module 21-4, and the model evaluation module 21-5 in the data training module 21 may be manufactured as at least one hardware chip and mounted on the test system 10. For example, at least one of the data obtaining module 21-1, the preprocessing module 21-2, the training data selection module 21-3, the model training module 21-4, and the model evaluation module 21-5 may be manufactured as an AI-dedicated hardware chip or as part of a previous general-purpose processor (for example, a CPU or an application processor) or a graphics-dedicated processor (for example, a GPU) and mounted on various test systems 10 described above.

Also, the data obtaining module 21-1, the preprocessing module 21-2, the training data selection module 21-3, the model training module 21-4, and the model evaluation module 21-5 may be mounted on one test system 10 or may be mounted on different test systems 10, respectively.

Also, at least one of the data obtaining module 21-1, the preprocessing module 21-2, the training data selection module 21-3, the model training module 21-4, and the model evaluation module 21-5 may be realized as a software module. When at least one of the data obtaining module 21-1, the preprocessing module 21-2, the training data selection module 21-3, the model training module 21-4, and the model evaluation module 21-5 is realized as a software module (or a program module including an instruction), the software module may be stored in non-transitory computer-readable recording media. Also, in this case, one or more software modules may be provided by an OS or a predetermined application. Alternatively, some of the one or more software modules may be provided by an OS, and the others may be provided by a predetermined application.

Figure 7:
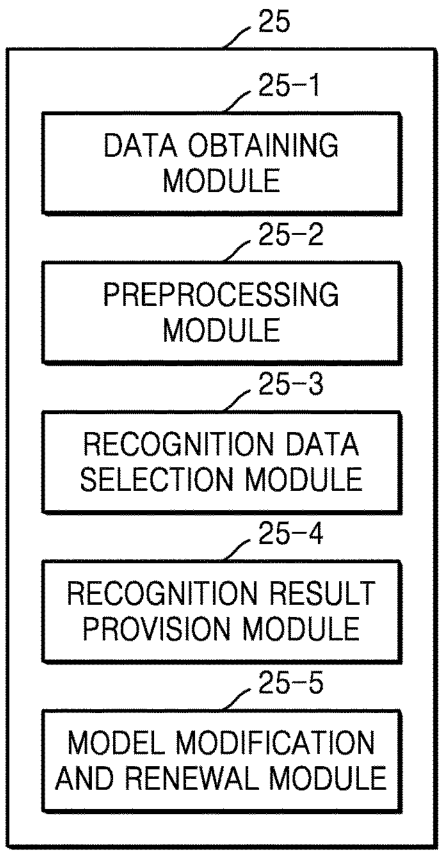
FIG. 7 is a block diagram of a data recognition module according to some example embodiments.

FIG. 7 is a block diagram of the data recognition module 25 according to some example embodiments.

Referring to FIG. 7, the data recognition module 25 according to some example embodiments may include a data obtaining module 25-1, a preprocessing module 25-2, a recognition data selection module 25-3, a recognition result provision module 25-4, and a model modification and renewal module 25-5. However, it is only some example embodiments, and the data recognition module 25 may include some of the elements described above or may further include other elements in addition to the elements described above.

The data obtaining module 25-1 may obtain data needed to or used to determine whether or not a target image sensor is defective and a defect level of the target image sensor, and the preprocessing module 25-2 may preprocess the obtained data so that the obtained data may be used to determine whether or not the target image sensor is defective and the defect level of the target image sensor. The preprocessing module 25-2 may process the obtained data into a predetermined format so that the recognition result provision module 25-4 to be described below may use the obtained data to determine whether or not the target image sensor is defective and the defect level of the target image sensor.

The recognition data selection module 25-3 may select, from the preprocessed data, recognition data needed to or used to determine whether or not the target image sensor is defective and the defect level of the target image sensor. The selected recognition data may be provided to the recognition result provision module 25-4. The recognition data selection module 25-3 may select part or all of the preprocessed recognition data, according to a predetermined selection criterion for determining whether or not the target image sensor is defective and the defect level of the target image sensor.

The recognition result provision module 25-4 may determine a condition by applying the selected data to a data recognition model. The recognition result provision module 25-4 may provide a recognition result according to a data recognition purpose. The recognition result provision module 25-4 may use the recognition data selected by the recognition data selection module 25-3 as an input value and may apply the selected recognition data to the data recognition model. In some example embodiments, the recognition result may be determined by the data recognition model.

The recognition result provision module 25-4 may provide image pattern information included in a test image. For example, the recognition result provision module 25-4 may provide information about a category including an identified image pattern, information about a name of the identified image pattern, and when the identified image pattern includes one or more defect patterns, information about a position of the image pattern. In some example embodiments, when the image pattern of a test image is identified as the one or more defect patterns, the recognition result provision module 25-4 may provide information about a defect level of the identified image pattern, according to the intensity of the visibility.

The model modification and renewal module 25-5 may control the data recognition model to be modified and renewed, based on evaluation with respect to the recognition result provided by the recognition result provision module 25-4. For example, the model modification and renewal module 25-5 may provide the recognition result provided by the recognition result provision module 25-4 to the model training module 21-4 and may control the model training module 21-4 to modify and renew the data recognition model.

At least one of the data obtaining module 25-1, the preprocessing module 25-2, the recognition data selection module 25-3, the recognition result provision module 25-4, and the model modification and renewal module 25-5 included in the data recognition module 25 may be manufactured as at least one hardware chip and may be mounted on the test system 10. For example, at least one of the data obtaining module 25-1, the preprocessing module 25-2, the recognition data selection module 25-3, the recognition result provision module 25-4, and the model modification and renewal module 25-5 may be manufactured as an AI-dedicated hardware chip or as part of a previous general-purpose processor (for example, a CPU or an application processor) and/or a graphics-dedicated processor (for example, a GPU) and mounted on various test systems 10 described above; example embodiments are not limited thereto.

In some example embodiments, the data obtaining module 25-1, the preprocessing module 25-2, the recognition data selection module 25-3, the recognition result provision module 25-4, and the model modification and renewal module 25-5 may be mounted on one test system 10 or may be mounted on different test systems 10, respectively.

In some example embodiments, at least one of the data obtaining module 25-1, the preprocessing module 25-2, the recognition data selection module 25-3, the recognition result provision module 25-4, and the model modification and renewal module 25-5 may be realized as a software module. When at least one of the data obtaining module 25-1, the preprocessing module 25-2, the recognition data selection module 25-3, the recognition result provision module 25-4, and the model modification and renewal module 25-5 is realized as a software module (or a program module including an instruction), the software module may be stored in non-transitory computer-readable recording media. Also, in this case, one or more software modules may be provided by an OS or a predetermined application. Alternatively, some of the one or more software modules may be provided by an OS, and the others may be provided by a predetermined application.

Figure 8:
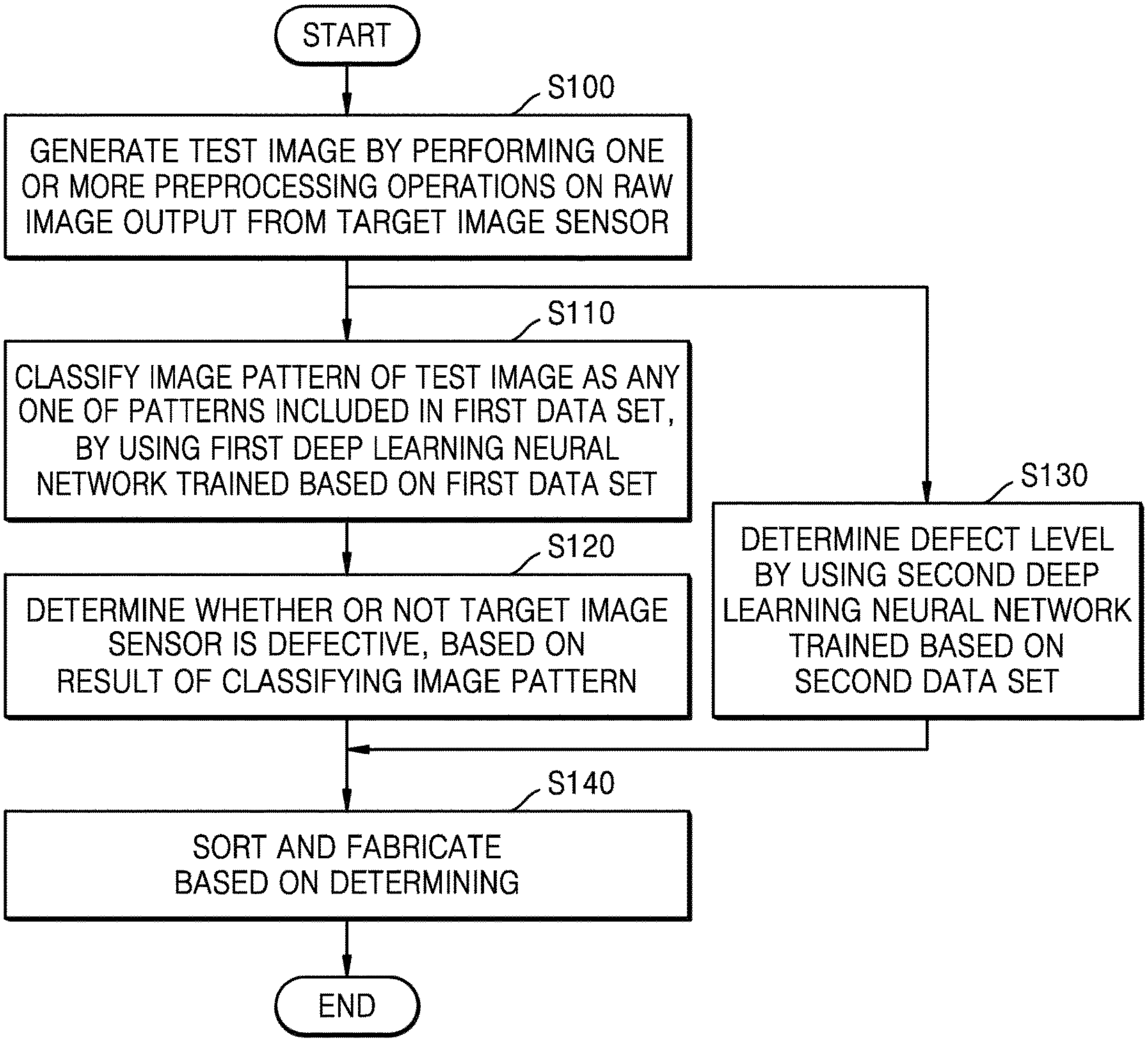
FIG. 8 is a flowchart of an operating method of a test device, according to some example embodiments.

FIG. 8 is a flowchart of an operating method of the test device 100, according to some example embodiments.

Referring to FIG. 8, a method, performed by the test device 100, of determining whether or not a target image sensor is defective and/or a defect level of the target image sensor may include operations S100 to S130. The test device 100 may perform operations of a first route (operations S100 to S120) and operations of a second route (operations S100 and S130) in parallel or may perform the operations of the first route (or the operations of the second route) and then may sequentially perform the operations of the second route (or the operations of the first route). The operations of the first route may indicate operations of a route for the test device 100 to determine (or predict) whether or not the target image sensor is defective, and the operations of the second route may indicate operations of a route for the test device 100 to determine (or predict) the defect level. It is assumed in FIG. 8 that a first deep learning neural network and a second deep learning neural network of the test device 100 are trained based on a Huber-loss function.

In operation S100, the test device 100 may generate a test image by performing one or more preprocessing operations on a raw image output from the target image sensor. The target image sensor may denote an image sensor on which performance evaluation is to be performed. The one or more preprocessing operations may include one or more of a calibration operation, an FPNR operation, a filtering operation, and a combination thereof, performed on the test image.

In operation S110, the test device 100 may classify an image pattern of the test image as any one of patterns included in a first data set, by using the first deep learning neural network trained based on the first data set. Here, the first data set may include a data set for each pattern, which is pre-classified to correspond to a normal pattern of an image and each of one or more defect patterns. For example, based on a training result of the first deep learning neural network, the test device 100 may calculate a matching score between the image pattern and the normal pattern and a matching score between the image pattern and each of the one or more defect patterns. Here, the one or more defect patterns may include dark blemish patterns including a spot pattern, a diagonal pattern, and an error pattern. According to some example embodiments, the test device 100 may classify the image pattern as a pattern having the highest matching score from among the calculated scores. According to some example embodiments, the test device 100 may apply predetermined weights (e.g., weights of 1:1:7:1) to the matching score of the normal pattern, the matching score of the spot pattern, the matching score of the diagonal pattern, and the matching score of the error pattern, with respect to the image pattern. The test device 100 may classify the image pattern as the pattern having the highest matching score based on a result of the calculating of the matching score reflecting the weights.

In operation S120, the test device 100 may determine whether or not an image sensor is defective, based on a result of the classifying of the image pattern. For example, the test device 100 may determine (or predict) that the target image sensor is a good product when the test device 100 classifies the image pattern as the normal pattern. For example, the test device 100 may determine (or predict) that the target image sensor is a defective product of a type corresponding to the image pattern when the test device 100 classifies the image pattern as any one of the one or more defect patterns.

In operation S130, the test device 100 may determine (or predict) a defect level of the test image by using the second deep learning neural network trained based on a second data set (here, the defect level of the test image may be estimated as a defect level of the target image sensor). Here, the second data set may include a data set for each defect level, which is pre-classified according to the intensity of the visibility of the entire defect patterns. For example, the test device 100 may determine (or predict) the defect level based on the visibility of the entire defect patterns included in the test image. Based on a training result of the second deep learning neural network, the test device 100 may calculate a matching score between the entire defect patterns included in the test image and the data set for each defect level. The test device 100 may determine (or predict) a level having the highest matching score from among the calculated scores as the defect level of the test image.

In operation S140, sorting and fabrication of an image sensor may be determined, e.g., based on the output of or the result of determining whether or not the target image sensor is defective. Based on the sorting and fabrication, a yield may be calculated, and in some example embodiments, may be improved upon. For example, based on the sorting in operation S140, a classification determined in operation S110 may be used as opportunities for yield improvement.

It is assumed that the first deep learning neural network and the second deep learning neural network of the test device 100 of FIG. 8 may be trained based on the Huber-loss function. However, inventive concepts is not limited thereto, and the test device 100 according to inventive concepts may perform a data training operation or a data recognition operation based on various functions or algorithms.

FIG. 9 is a diagram for describing the degree of accuracy of an operation, performed by the test device 100, of determining whether or not an image sensor is defective, according to some example embodiments.

FIG. 9 is the diagram for comparing the degree of accuracy with respect to determining whether or not an image sensor is defective, between a first test database (DB) and a second test DB of the test device 100, according to the inventive concept.

In FIG. 9, "Acc" indicates the number of images on which the test device 100 accurately performs determination (or prediction) as to whether or not the images are actually defective from among the number of images on which the test device 100 performs determination (or prediction) as to whether or not the images are defective, and "F1-score" may be a resource for complementing "Acc" and may have a range of "0 to 1," with a value closer to "1" indicating better prediction performance of the test device 100, wherein "F1-score" may be determined based on an harmonic average of "precision" and "recall" (e.g., 2*(precision*recall)/(precision+recall)). "Precision" indicates a ratio of images which are actually normal to test images classified by the test device 100 as having a normal pattern and may be calculated based on a formula of "TP/(TP+FP)." "Recall" indicates a ratio of test images classified by the test device 100 as having a normal pattern to actually normal images and may be calculated based a formula of "TP/(TP+FN)." Here, "TP" may indicate the number of images which are actually normal from among the test images classified by the test device 100 as having the normal pattern, "FP" may indicate the number of images which are actually defective from among the test images classified by the test device 100 as having the normal pattern, and "FN" may indicate the number of images which are actually normal from among test images classified by the test device 100 as having a defect pattern (e.g., a spot pattern, a diagonal pattern, or an error pattern).

With respect to a result of the determining (or predicting) via the test device 100 with respect to the first test DB, it is shown that Acc is "0.991" and F1-score is "0.966." Also, with respect to a result of the determining (or predicting) via the test device 100 with respect to the second test DB, it is shown that Acc is "0.969" and F1-score is "0.942." It is shown that an average Acc of the determining (or predicting) via the test device 100 with respect to the first test DB and the second test DB is "0.976" and an average F1-score is "0.952." Accordingly, it may be identified that the result of the determining (or predicting) of whether or not the image sensor is defective, via the test device 100, has a significantly high level of accuracy and/or reliability.

FIG. 10 is a diagram for describing the degree of accuracy of an operation, performed by the test device 100, of determining whether or not an image sensor is defective, according to some example embodiments.

Referring to FIG. 10, A indicates a degree of accuracy of defect determination of a test device according to a comparative embodiment, and B indicates a degree of accuracy of defect determination of the test device 100 according to some example embodiments. It is assumed that the determining of whether or not the image sensor is defective described in FIG. 10 is performed based on data specifications used in an actual device manufacturing process.

FIG. 10 illustrates results of determining (or predicting) whether or not a total of nine image sensors including a first sensor S1 to a ninth sensor S9 are defective. For example, it is shown that, when whether or not the fifth sensor S5 is defective is determined by using 247 images, Acc of A is "0.6154" while Acc of B is "0.0019" and F1-score of A is "0.7059" while F1-score of B is "0.9952." As another example, it is shown that, when whether or not the sixth sensor S6 is defective is determined by using 704 images, Acc of A is "0.7884" while Acc of B is "0.9688" and F1-score of A is "0.7950" while F1-score of B is "0.9753."

Thus, compared to the test device according to the comparative embodiment, the test device 100 according to some example embodiments may have a higher degree of accuracy of determination (e.g., Acc) and a higher degree of reliability (e.g., F1-score) of a determination result with a high match rate between the result of determining whether or not the target image sensor is defective and the actual data.

Figure 11:
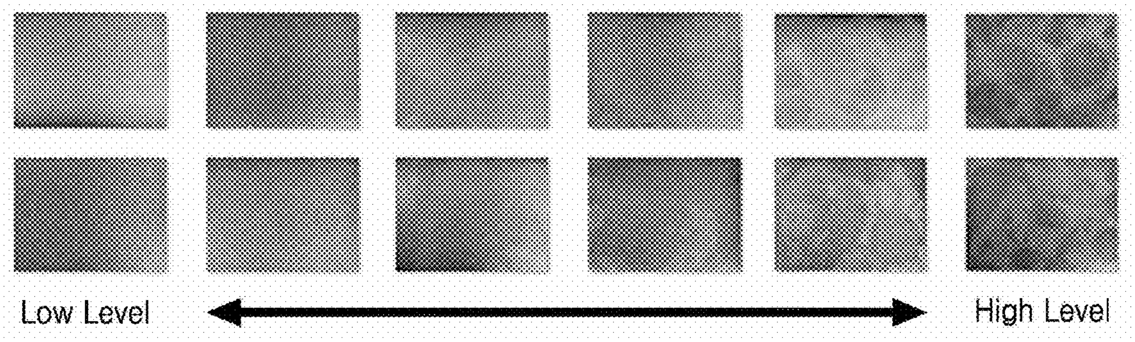
FIG. 11 is a diagram for describing an operation, performed by a test device, of determining a defect level, according to some example embodiments.

FIG. 11 is a diagram for describing an operation, performed by the test device 10, of determining a defect level, according to some example embodiments.

In detail, FIG. 11 illustrates a result of determining (or predicting), via the test device 100 according to some example embodiments, a defect level of each of test images according to an intensity of the visibility of the entire defect patterns in each of the test images of a plurality of image sensors. In this specification, the defect level of the test image may be estimated as a defect level of the image sensor corresponding to the test image.

Referring to FIG. 11, when the intensity of the visibility of the entire defect patterns included in a test image is increased, the test device 100 may determine (or predict) an increased defect level of the corresponding test image, and when the intensity of the visibility of the entire defect patterns included in a test image is decreased, the test device 100 may determine (or predict) a decreased defect level of the corresponding test image.

For example, it is shown that the test device 100 may determine (or predict) the defect level of the test image arranged on the right side of the drawing (FIG. 11) to be higher than the defect level of the test image arranged on the left side of the drawing (FIG. 11). As illustrated in FIG. 11, it may be identified that from the left side to the right side in the drawing (FIG. 11), the intensities of the visibility of the entire defect patterns included in the test images are actually increased.

Therefore, the test device 100 according to some example embodiments may provide a highly accurate result of determining (or predicting and/or assessing) a defect level of a test image. In particular, the test device 100 according to some example embodiments may greatly contribute to the adjusting of a device production yield rate by making defective degrees of manufactured devices (e.g., image sensors) as numerical defect levels. For example, when there is a need to increase the device production yield rate, the test device 100 may lower a criterion for a "good product," e.g., a criterion for a defect level corresponding to the good product, and when there is a need to decrease the device production yield rate, the test device 100 may reinforce the criterion for the "good product," that is, the criterion for the defect level corresponding to the good product. The test device 100 may adaptively change the criterion for the defect level corresponding to the good product, according to the production yield rate of the device, thereby ultimately increasing the efficiency of the process of manufacturing the device.

Figure 12:
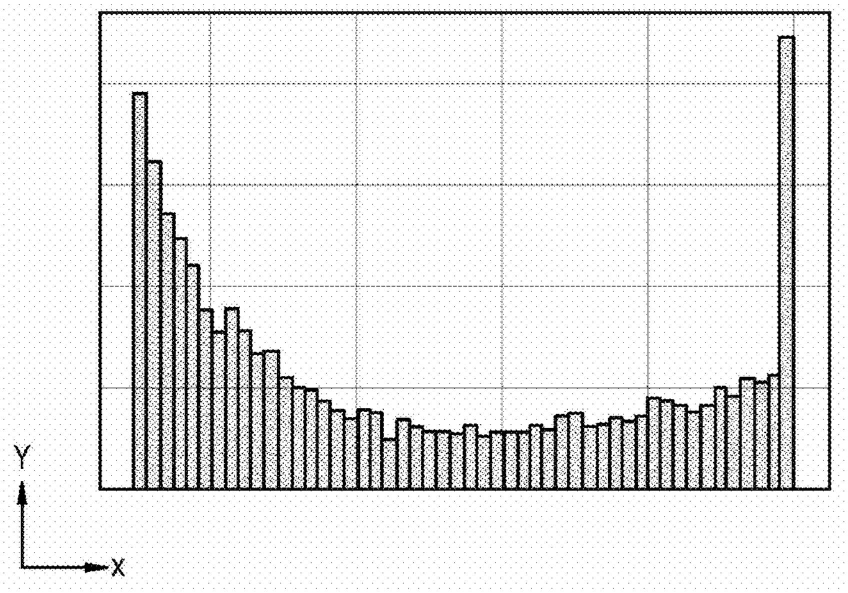
FIG. 12 is a diagram for describing a result of an operation, performed by a test device, of determining a defect level, according to some example embodiments.

FIG. 12 is a diagram for describing a result of an operation, performed by the test device 100, of determining of a defect level, according to various example embodiments.

In FIG. 12, it is assumed that with respect to the result (graph) of the determining of the defect level via the test device 100, a horizontal axis (an x axis) indicates the defect level, and a vertical axis (a y axis) indicates the number of test images. For example, FIG. 12 may be referred to as a histogram of defect levels. As described herein, the defect level of a test image may be estimated as the defect level of an image sensor corresponding to the test image.

Referring to FIG. 12, it may be identified that, unlike the test device according to comparative examples, the result of the determining of the defect level via the test device 10 according to some example embodiments may not be overfit in a predetermined level in a predetermined range (e.g., from 0.0 to 1.0) and the defect levels of the test images according to the intensity of the visibility of the entire defect patterns included in each of the test images may be evenly distributed.

Thus, the test device 100 according to some example embodiments may greatly contribute to the efficient adjusting of a device production yield rate by making defective degrees of manufactured devices (e.g., image sensors) as numerical defect levels.

FIG. 13 is a diagram for describing a degree of accuracy of an operation, performed by the test device 100, of determining a defect level, according to some example embodiments.

In detail, FIG. 13 is the diagram for describing a Pearson correlation coefficient calculated based on comparison between a mean opinion score (MOS) test result and a result of determining a defect level via the test device 100 according to some example embodiments, with respect to the total of 10 test data sets. It is assumed that each of the total of 10 test data sets includes pieces of test image data (e.g., 11 pieces) having different intensities of the visibility. Also, for each of the total of 10 test data sets, the MOS test result may indicate a result labeled in 11 levels based on an order of the intensities of the visibility. In this specification, a defect level of a test image may be estimated as a defect level of an image sensor corresponding to the test image.

Referring to FIG. 13, it is shown that the Pearson correlation coefficient with respect to a first data set is "0.981," the Pearson correlation coefficient with respect to a second data set is "0.990," the Pearson correlation coefficient with respect to a third data set is "0.956," the Pearson correlation coefficient with respect to a fourth data set is "0.990," the Pearson correlation coefficient with respect to a fifth data set is "0.956," the Pearson correlation coefficient with respect to a sixth data set is "0.962," the Pearson correlation coefficient with respect to a seventh data set is "0.967," the Pearson correlation coefficient with respect to an eighth data set is "0.956," the Pearson correlation coefficient with respect to a ninth data set is "0.888," and the Pearson correlation coefficient with respect to a tenth data set is "0.976."

As illustrated in FIG. 13, it may be identified that the Pearson correlation coefficients between the result of the determining of the defect level via the test device 100 according to some example embodiments and the MOS test result have high match rates of "0.95" or higher, with respect to all the nine test data sets, except with respect to one set (e.g., the ninth test data set). For example, it may be understood that the labeling order according to the intensities of the visibility with respect to the result of the determining of the defect level via the test device 100 may be almost the same as the labeling order according to the intensities of the visibility with respect to the MOS test result. Accordingly, the test device 100 according to some example embodiments may provide a highly accurate result of determining (or predicting and/or assessing) the defect level of the test image.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While inventive concepts has been particularly shown and described with reference to various example embodiments thereof, it will be understood that various changes in form and details may be made therein without departing from the spirit and scope of the following claims. Additionally example embodiments are not necessarily mutually exclusive with one another. For example, some example embodiments may include one or more features described with reference to one or more figures, and may also include one or more features described with reference to one or more other figures.

What is claimed is:

1. A test device comprising:

a processor configured to execute instructions that, when executed by the processor, cause the test device to generate a test image by performing one or more preprocessing operations on a raw image output from an image sensor, classify an image pattern of the test image as any one of patterns included in a first data set by using a first deep learning neural network trained based on the first data set, and determine, based on a classifying result, whether or not the image sensor is defective, wherein the first data set comprises a data set for each pattern, classified to correspond to each of one or more defect patterns and to a normal pattern of an image, and wherein the test device is further caused to calculate, based on a training result of the first deep learning neural network, a matching score between the image pattern and the normal pattern and a matching score between the image pattern and each of the one or more defect patterns, and classify the image pattern of the test image based on a highest matching score from among the calculated scores.

2. The test device of claim 1, wherein the test device is further caused to, determine that the image sensor is a good product in response to classifying the image pattern as the normal pattern, and determine that the image sensor is a defective product of a type corresponding to the image pattern in response to classifying the image pattern as any one of the one or more defect patterns.

3. The test device of claim 1, wherein the one or more defect patterns comprise a spot pattern, a diagonal pattern, and an error pattern.

4. The test device of claim 1, wherein the one or more preprocessing operations comprise one or more of a calibration operation, a fixed-point noise reduction (FPNR) operation, and a filtering operation.

5. The test device of claim 1, wherein the test device is further caused to determine a defect level of the test image by using a second deep learning neural network trained based on a second data set, wherein the defect level is determined based on a visibility of entire defect patterns included in the test image.

6. The test device of claim 5, wherein the second data set comprises a data set for each defect level classified according to an intensity of the visibility of the entire defect patterns, wherein training the second deep learning neural network includes using the intensity of the visibility of the entire defect patterns.

7. The test device of claim 5, wherein the test device is further caused to, calculate, based on a training result of the second deep learning neural network, a matching score between the entire defect patterns included in the test image and the data set for each defect level, and determine the defect level of the test image as a level having a highest matching score from among the calculated scores.

8. The test device of claim 5, wherein the first deep learning neural network is trained based on a first Huber-loss function, and the second deep learning neural network is trained based on a second Huber-loss function.

9. An operating method of a test device, the operating method comprising:

generating a test image by performing one or more preprocessing operations on a raw image output from an image sensor;

classifying an image pattern of the test image as any one of patterns included in a first data set by using a first deep learning neural network trained based on the first data set; and determining, based on a result of the classifying, whether or not the image sensor is defective, wherein the first data set comprises a data set for each pattern classified to correspond to each of one or more defect patterns and to a normal pattern of an image, and wherein the classifying of the image pattern comprises:

calculating, based on a training result of the first deep learning neural network, a matching score between the image pattern and the normal pattern and a matching score between the image pattern and each of the one or more defect patterns; and classifying the image pattern of the test image based on a highest matching score from among the calculated scores.

10. The operating method of claim 9, wherein the determining of whether or not the image sensor is defective comprises:

determining that the image sensor is a good product in response to the image pattern being classified as the normal pattern; and determining that the image sensor is a defective product of a type corresponding to the image pattern in response to the image pattern is classified as any one of the one or more defect patterns.

11. The operating method of claim 9, wherein the one or more defect patterns comprise a spot pattern, a diagonal pattern, and an error pattern.

12. The operating method of claim 9, wherein the one or more preprocessing operations comprise one or more of a calibration operation, a fixed-point noise reduction (FPNR) operation, and a filtering operation.

13. The operating method of claim 9, further comprising:

determining a defect level of the test image by using a second deep learning neural network trained based on a second data set, wherein the defect level is determined based on a visibility of entire defect patterns included in the test image.

14. The operating method of claim 13, wherein the second data set comprises a data set for each defect level, classified according to an intensity of the visibility of the entire defect patterns, wherein training the second deep learning neural network includes using an intensity of the visibility of the entire defect patterns.

15. The operating method of claim 13, wherein the determining of whether or not the image sensor is defective further comprises:

calculating, based on a training result of the second deep learning neural network, a matching score between the entire defect patterns included in the test image and the data set for each defect level; and determining the defect level of the test image based on a highest matching score from among the calculated scores.

16. The operating method of claim 13, wherein the first deep learning neural network is trained based on a first Huber-loss function, and the second deep learning neural network is trained based on a second Huber-loss function.

17. A system for testing whether or not an image sensor is defective, the system comprising:

a memory configured to store one or more instructions; and a processor configured to execute the one or more instructions stored in the memory to, generate a test image by performing one or more preprocessing operations on a raw image received from an image sensor, detect an image pattern of the test image by using a first deep learning neural network trained based on a first data set, determine, based on a detecting result regarding the image pattern, whether or not the image sensor is defective, and determine a defect level of the test image by using a second deep learning neural network trained based on a second data set, wherein the first data set comprises a data set for each pattern, classified to correspond to a normal pattern of an image and each of one or more defect patterns, and wherein the second data set comprises a data set for each defect level, classified according to an intensity of a visibility of entire defect patterns.

* * * * *